United States Patent [19]

Minck

[11] 4,091,151

[45] May 23, 1978

[54] SECONDARY BATTERY OR CELL WITH IMPROVED RECHARGEABILITY

[75] Inventor: Robert W. Minck, Lathrup Village, Mich.

[73] Assignee: Ford Motor Company, Dearborn, Mich.

[21] Appl. No.: 833,548

[22] Filed: Sep. 15, 1977

[51] Int. Cl.² .................................. H01M 10/39
[52] U.S. Cl. .............................. 429/104; 429/218
[58] Field of Search ............... 429/104, 102, 31, 30, 429/191, 193, 218, 103

[56] References Cited

U.S. PATENT DOCUMENTS

| | | | |
|---|---|---|---|
| 3,982,957 | 9/1976 | Jones et al. | 429/104 X |
| 3,993,503 | 11/1976 | Ludwig | 429/103 |

*Primary Examiner*—Anthony Skapars
*Attorney, Agent, or Firm*—Roger L. May; Keith L. Zerschling

[57] ABSTRACT

An improved secondary battery or cell of the type comprising: (A) an anodic reaction zone containing a molten alkali metal reactant-anode in electrical contact with an external circuit; (B) a cathodic reaction zone containing a cathodic reactant comprising a liquid electrolyte which is electrochemically reactive with said anodic reactant and an electrode of porous conductive material which is at least partially immersed in said cathodic reactant; and (C) a cation-permeable barrier to mass liquid transfer interposed between and in contact with said anodic and cathodic reaction zones, said porous conductive material being in electrical contact with both said cation-permeable barrier and an external circuit. The improvement of the invention comprises employing a cation-permeable barrier having major grooves or channels being devoid of said porous conductive material and being adapted in size and shape such that polysulfide salts within said cathodic reaction zone can flow therein by capillary forces.

26 Claims, 3 Drawing Figures

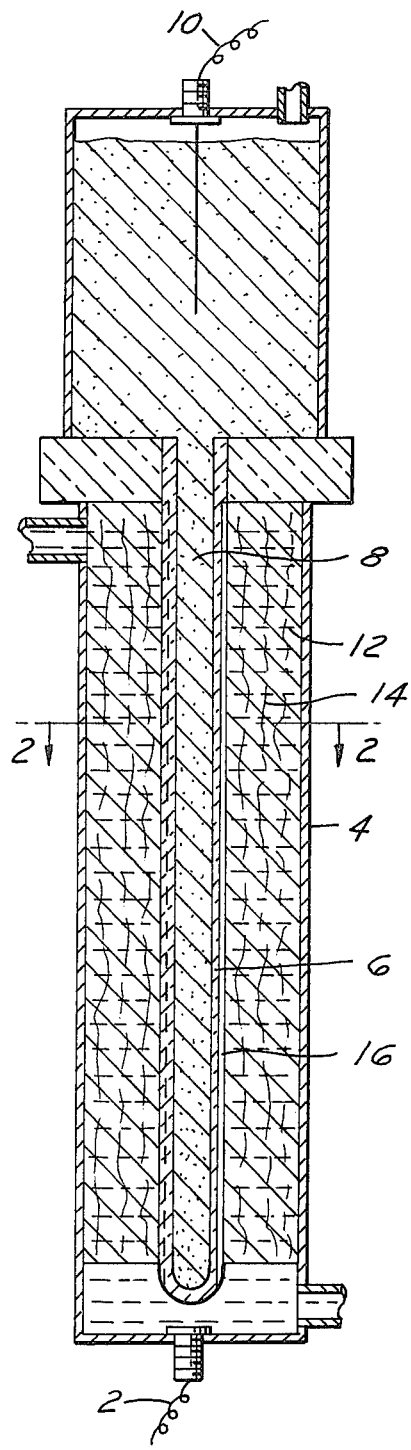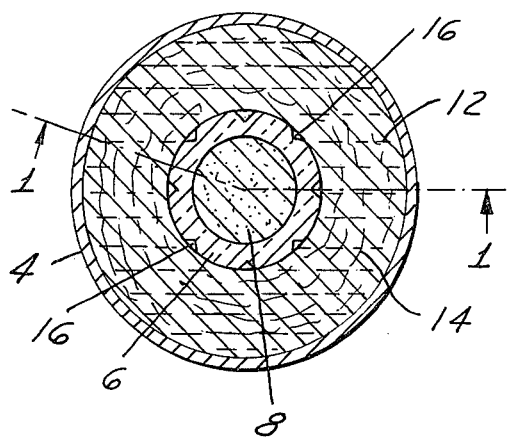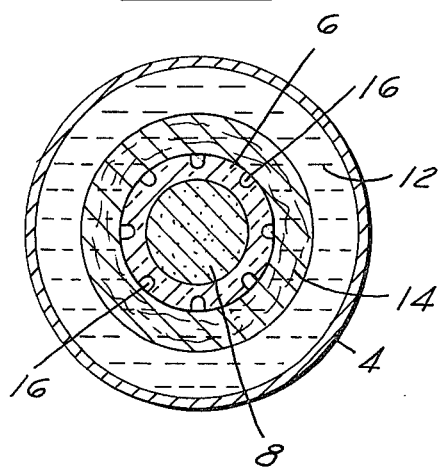

SECONDARY BATTERY OR CELL WITH IMPROVED RECHARGEABILITY

The invention herein described was made in the course of or under a contract or subcontract thereunder with the National Science Foundation.

This application relates to an improved secondary cell or battery of the type comprising at least one molten alkali metal anode, at least one cathode, a liquid electrolyte electrochemically reversibly reactive with said alkali metal and in contact with said cathode, and a cation-permeable barrier to mass liquid transfer interposed between and in contact with said anode and said liquid electrolyte.

More particularly, this application relates to an improved alkali metal/sulfur battery or cell exhibiting improved rechargeability and increased ampere-hour capacity.

BACKGROUND OF THE INVENTION

A recently developed type of secondary or rechargeable electrical conversion device comprises: (A) an anodic reaction zone containing a molten alkali metal anode-reactant, e.g., sodium, in electrical contact with an external circuit; (B) a cathodic reaction zone containing (i) a cathodic reactant comprising sulfur or a mixture of sulfur and molten polysulfide, which is electrochemically reversibly reactive with said anodic reactant, and (ii) a porous conductive electrode which is at least partially immersed in said cathodic reactant; and (C) a solid electrolyte comprising a cation-permeable barrier to mass liquid transfer interposed between and in contact with said anodic and cathodic reaction zones. As used herein the term "reactant" is intended to means both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the surface of the electrode by reaction of the cathodic reactant with electrons conducted through the electrode from the external circuit. Because the ionic conductivity of the liquid electrolyte is less than the electronic conductivity of the electrode material, it is desirable during discharge that both electrons and sulfur be applied to and distributed along the surface of the conductive material in the vicinity of the cation-permeable solid electrolyte. When the sulfur and electrons are so supplied, polysulfide ions can be formed near the solid electrolyte and the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus, electrons are removed from the alkali metal polysulfide by charge transfer at the surface of the electrode and are conducted through the electrode material to the external circuit, and the alkali metal cation is conducted through the liquid electrolyte and solid electrolyte to the anode where it accepts an electron from the external circuit. Because of the aforementioned relative conductivities of ionic and electronic phases, this charging process occurs preferentially in the vicinity of the electrolyte consuming the alkali metal polysulfide and forming molten elemental sulfur.

A number of U.S. patents and U.S. applications, all assigned to Ford Motor Company, the assignee of the invention described and claimed herein, are directed toward the achievement of improved rechargability and increased ampere hour capacity of secondary batteries or cells of the type to which the subject invention is directed. Thus, U.S. Pat. Nos. 3,811,943, 3,951,689 and 3,980,496 are directed to energy conversion devices including secondary batteries or cells which allow or promote improved mass transportation of reactants and reaction products to and from the vicinity of the solid electrolyte and the electrodes during both discharge and charge, thereby increasing the ampere-hour capacity of the secondary battery or cell. U.S. Pat. No. 3,966,492 is directed toward the use of a particular electrode material to improve ampere-hour capacity while U.S. Pat. No. 3,976,503 is directed toward a particular process involving temperature gradients to improve rechargeability of the battery or cell.

U.S. Pat. Nos. 3,985,575 and 3,993,503 claim a combination of particular electrode materials plus improved electrode design to achieve improved charging and discharging characteristics. U.S. Pat. Nos. 4,002,806 and 4,002,807 teach improving the charge/discharge capacity of the battery or cell by including controlled amounts of certain additives in the cathodic reactant.

The invention described and claimed herein provides a simplified alternative to the processes, cell design modifications and material modifications disclosed and claimed in the above identified U.S. patents and patent applications. Unlike the inventions disclosed and claimed in those patents and applications, the invention disclosed and claimed herein does not rely on a modification of the cathodic reaction zone or its means of operation, but rather involves modification of the surface of the cation-permeable barrier. As such, the improvement of the invention may be employed alone to increase rechargeability and resultant ampere-hour capacity or it may be used in conjunction with one or more methods or other improvements for improving rechargeability, including those disclosed and claimed in the patents and applications discussed above.

BRIEF DESCRIPTION OF THE INVENTION

The improvement of this invention comprises employing a cation-permeable barrier having major grooves or channels disposed in the surface thereof which is in contact with the cathodic reaction zone of the secondary battery or cell, the grooves or channels being devoid of the porous conductive material used as the electrode and adapted in size and shape such that polysulfide salts within the cathodic reaction zone can flow therein by capillary forces. The conductive ceramic employed in the secondary batteries or cells to which the invention is directed is wetted by polysulfide and the invention disclosed and claimed herein utilizes that feature in combination with the described grooves or channels to supply polysulfide along the surface of the ceramic and to thereby improve rechargeability by supplying reactants at the ideal location for recharging.

The invention will be more fully understood after reading the following detailed description thereof in conjunction with the drawings in which:

FIG. 1 is a vertical sectional view of a cell design incorporating the improvement of this invention; and FIGS. 2 and 3 are cross-sectional views of a cell such as shown in FIG. 1 showing several embodiments of the claimed invention.

DETAILED DESCRIPTION OF THE INVENTION

Description of Device to Which Improvement Applies

The type of secondary or rechargeable electrical conversion devices to which the improvement of this invention applies and various components thereof are disclosed in numerous U.S. patents represented by the following, the disclosures of which are incorporated herein by reference: U.S. Patent Nos. 3,404,035; 3,404,036; 3,458,356; 3,466,677; 3,468,709; 3,468,719; 3,475,220; 3,475,223; 3,475,225; 3,535,163; 3,719,531; 3,811,493; 3,951,689; 3,966,492; 3,976,503; 3,890,496; 3,985,575; 3,985,576; 3,933,503; 3,994,745; 4,002,806 and 4,002,807.

As discussed above, the secondary batteries or cells to which the improvement of the invention applies comprise generally: (A) an anodic reaction zone containing a molten alkali metal reactant-anode in electrical contact with an external circuit; (B) a cathodic reaction zone containing (i) a cathodic reactant comprising a liquid electrolyte selected from sulfur or a mixture of sulfur and sulfur saturated polysulfide of said molten alkali metal reactant which is electrochemically reversibly reactive with said anodic reactant and (ii) an electrode which is at least partially immersed in said cathodic reactant and (C) a cation-permeable barrier to mass liquid transfer interposed between and in contact with said anodic and cathodic reaction zones, said electrode being in electrical contact with both said cation-permeable barrier and the external circuit.

The anodic reactant or sacrificial electrode employed in such devices is an alkali metal which is maintained above its melting point when the device is in operation. Sodium is the preferred alkali metal for use in such devices; however, potassium, lithium, other alkali metals, mixtures of such alkali metals, or alloys containing such alkali metals can also be used.

The cathodic reactant of the fully charged battery or cell is molten sulfur, which is electrochemically reversibly reactive with the anodic reactant. Formation of polysulfide salts and the phase change of the cathodic reactant during discharge and charge cycles of the secondary battery or cell are well recognized in the art and are described in detail in a number of the above patents and applications.

The anodic reactant is separated from the cathodic reactant by a solid barrier to mass liquid transfer that is selectively ionically conductive with respect to cations of the anodic reactant and substantially impermeable to other ions which may be stored in the cathodic reactant. The nature of cation-permeable barrier is discussed in detail in a number of the above referenced patents and applications. As noted in those applications, both glasses and polycrystalline ceramic materials are suitable for use in such devices as the solid electrolyte. Polycrystalline ceramic materials useful are bi- or multi-metal oxides, and those most useful are those in the family of beta-alumina, all of which exhibit a generic crystalline structure which is readily identifiable by X-ray diffraction. Beta-type alumina materials are well known in the art and those beta-type aluminas which are most suitable for use in the secondary battery or cells to which the improvement of this invention relates are described in the above patents and applications as well as in the open literature. Among the most preferred useful beta-type aluminas are:

(1) Standard beta-type alumina comprising a series of layers of aluminum oxide held apart by layers of linear Al-O bond chains with sodium occupying sites between the layers and columns;
(2) Boron oxide modified beta-type alumina;
(3) Substituted beta-type alumina wherein sodium ions are replaced in whole or in part by other positive ions which are preferably metal ions; and
(4) Beta-type alumina modified by the addition of a minor proportion by weight of metal ions having a valence not greater than 2, preferably lithium or magnesium or a combination of lithium and magnesium.

As discussed in the above patents and applications, the porous conductive electrode in the cathodic reaction zone is in electrical contact with the cation-permeable barrier and an external circuit. The conductive material may comprise any porous material which is electronically conductive and which is resistant to attack by reactants within the cathodic reaction zone.

While the secondary cells or batteries to which the improvement of this invention is applicable may have a number of different configurations, a preferred configuration comprises: (1) a container, preferably tubular; (2) a cation-permeable barrier to mass liquid transfer, preferably tubular, which is disposed within said container so as to create a first reaction zone within the barrier and a second reaction zone between the barrier and the container; (3) a molten alkali metal anodic reactant within one of said reaction zones which becomes the anodic reaction zone, and which is in electrical contact with an external electrical circuit; (4) a cathodic reactant comprising a liquid electrolyte which is electrochemically reversibly reactive with the anodic reactant disposed within the other reaction zone which becomes the cathodic reaction zone; and (5) an electrode disposed within the cathodic reaction zone, immersed at least in part in the cathodic reactant and in electrical contact with both the barrier and the external circuit. These secondary cells, which are preferably tubular or cylindrical, thus comprise reaction zones which completely surround the solid electrolyte. In the most preferred embodiments, the first reaction zone within the cation-permeable barrier is the anodic reaction zone.

Improvement of the Invention

The improvement of the subject invention provides a simplified alternative to that described in the above discussed background patents and applications for obtaining improved rechargeability of alkali metal/sulfur cells and the concommitant increase in charge/discharge capacity. The conductive ceramic employed as the cation-permeable barrier in the secondary batteries or cells to which the improvement of the invention applies is wetted by the polysulfide salts of the alkali metal, and the invention disclosed and claimed herein utilizes that feature to supply polysulfide along the surface of the ceramic and to thereby improve rechargeability by supplying reactant at the ideal location for charging. This concept is especially important for battery applications requiring a high rate and highly efficient charge capability, e.g., those suited for use in load levelling applications. It is imperative that the battery or cells used in such applications operate so as to keep the maximum amount of the ceramic area active in the recharging process. This can be accomplished by the improvement of this invention which involves the use of a cation-permeable barrier having major grooves or channels disposed on the surface thereof which is in contact with the cathodic reaction zone. The grooves of the channels are devoid of porous conductive electrode material and are adapted in size and shape such that the polysulfide salts within the cathodic reaction zone can flow therein by capillary forces. These major grooves or channels are disposed on the surface of the ceramic in such a pattern as to effect uniform distribution of the polysulfide salts throughout the exposed surface of the cation-permeable barrier. Polysulfide can then be supplied to the surfaces between the channels by creeping through the network of surface features which are present on the material used as the cation-permeable barrier as the polysulfide is being consumed by the electrode process.

Preferably, the major grooves or channels taper inwardly toward the interior of the cation-permeable wall and have a width at the surface of the cation-permeable barrier wall in contact with the cathodic reaction zone of between about 10 and about 100 microns, most preferably between about 20 and about 50 microns. A particularly advantageous cross-sectional shape for the major grooves or channels is that of an equilateral triangle with the base of the triangle being substantially along the exterior wall of the cation-permeable barrier on the side thereof exposed to the cathodic reaction zone and the apex thereof oriented toward the in interior of the cation-permeable barrier wall.

The major grooves or channels, as mentioned above, can be disposed in any direction on the cation-permeable barrier so as to effect adequate rate of fluid flow by capillarity. In one embodiment the grooves or channels may be disposed in substantially one direction along substantially the entire length of the cation-permeable barrier surface. Ideally this direction is substantially parallel to the vertical axis of the battery or cell. In those cases wherein the preferred vertically oriented tubular embodiments of the battery or cell are employed, the major grooves or channels preferably run in a substantially vertical direction.

Minor grooves or channels having dimensions smaller than those of the major grooves or channels may also be used to provide fluid flow of polysulfide in directions transverse to the major grooves or channels. In those embodiments wherein the major grooves or channels run in a vertical direction, the minor grooves or channels run in a vertical direction, the minor grooves or channels may run transverse thereto, and, in the case of the tubular cation-permeable barrier, such minor grooves or channels may run circumferentially about the barrier. In still another alternative embodiment among the many which may be envisioned within the scope of this invention, the major grooves or channels may be disposed helically about the cation-permeable barrier.

The improvement of the invention is most ideally employed in conjunction with a cathodic reaction zone design wherein the porous electrode does not fill the entire reaction zone, thus leaving open spaces through which the cathodic reactant may flow. When such a design is employed, mass liquid transport of cathodic reactants is enhanced, thus allowing the denser polysulfide to settle to the bottom of the reaction zone from where it may be readily wicked or drawn up the grooves or channels in said cation-barrier by capillary action.

All of the aforementioned preferred designs and others will be better understood from the following detailed description of the drawings in which the numerals common to each drawing define a common component of the cell shown therein.

DETAILED DESCRIPTION OF THE DRAWINGS

FIG. 1 shows a full vertical cross-section of the preferred tubular type cell to which the improvement of this invention relates. FIGS. 2 and 3 are merely cross-sectional views of such tubular cell showing several illustrative embodiments of the improvement of the invention.

The cell shown in FIG. 1 comprises: a tubular container 4 which may be in electrical contact with an external circuit via lead 2; a tubular cation-permeable barrier to mass liquid transfer 6 which is disposed within said tubular container 4 so as to create an anodic reaction zone within the tubular barrier containing a molten alkali metal reactant-anode 8 which is in electrical contact via lead 10 to an external circuit; a cathodic reaction zone between tubular barrier 6 and tubular container 4; a molten cathodic reactant 12 and a porous electrode 14 which is disposed within the cathodic reaction zone. The vertical sectional view of FIG. 1 shows a vertical major groove or channel running from the top to the bottom of the cation-permeable barrier. It will be appreciated that such grooves or channels may also run in a helical fashion and that horizontal or circumferential minor grooves or channels transverse to the vertical major grooves or channels may be disposed in the surface.

FIG. 2 shows a cross-section of the cell of FIG. 1 in which the cation-permeable barrier 6 is shown somewhat enlarged such that grooves 16 are clearly visible therein. As mentioned above, the grooves may have any desired cross-sectional shape desirably tapering inwardly toward the interior of cation-permeable barrier wall. Preferably, the major grooves or channels taper in to form a cross-sectional shape which is that of an equilateral triangle as shown in FIG. 2. As discussed above, the improvement of this invention may be and is desirably combined with any of the prior art designs, processes and other features intended to improve mass transport of reactants within the cathodic reaction zone. While FIG. 2 shows a conventional cell wherein the porous electrode material 14 fills or substantially fills the entire cathodic reaction zone, FIG. 3, which shows a preferred cross-sectional design for use in the improvement of this invention, shows a design in which the porous electrode material is confined to an area immediately adjacent the cation-permeable barrier. The remainder of the space between container 4 and the porous electrode material 14 is open so as to allow free flow of reactants within the container. As discussed above, this design will allow polysulfide, which is denser than sulfur, to settle to the bottom of the cathodic reaction zone from where it may be wicked or drawn during charging up said grooves or channels by capilllarity.

It will be appreciated that various cathodic reaction zone designs and configurations may be employed and that the grooves or channels within the cation-permeable barrier may be disposed in any desirable pattern which will allow for fluid flow of the polysulfide salts within the channels during the recharging cycle of the battery.

In view of this disclosure, many modifications of the improvement of this invention will be apparent to those skilled in the art. It is intended that all such modifications which fall within the scope of this invention be included within the terms of the appended claims.

I claim:

1. In a secondary battery or cell comprising:
   A. an anodic reaction zone containing a molten alkali metal reactant-anode in electrical contact with an external circuit;
   B. A cathodic reaction zone containing a cathodic reactant which, when said battery or cell is at least partially discharged, is selected from the group consisting of (i) a single phase composition comprising molten polysulfide salts of said anodic reactant and (ii) a two-phase composition comprising molten sulfur and molten sulfur saturated polysulfide salts of said anodic reactant;
   C. A cation-permeable barrier to mass liquid transfer interposed between and in contact with said anodic and cathodic reaction zones; and
   D. An electrode of porous conductive material within said cathodic reaction zone for transporting electrons to the vicinity of said cation-permeable barrier during discharge of said battery or cell and for transporting electrons away from the vicinity of said cation-permeable barrier during charge of said battery or cell, said porous conductive material being in electrical contact with both said cation-permeable barrier and said external circuit and being immersed, at least in part, in said cathodic reactant,
   wherein the improvement comprises employing a cation-permeable barrier having major grooves or channels disposed in the surface thereof which is in contact with said cathodic reaction zone, said grooves or channels being devoid of said porous conductive material and being adapted in size and shape such that polysulfide salts within said cathodic reaction zone can flow therein by capillary forces.

2. A second battery or cell in accordance with claim 1 wherein said major grooves or channels have a width at the surface of said cation-permeable barrier in contact with said cathodic reaction zone of between about 10 and about 100 microns and wherein said major grooves or channels taper inwardly toward the interior of said cation-permeable barrier wall.

3. A secondary battery or cell in accordance with claim 2 wherein said major grooves or channels have a width at the surface of said cation-permeable barrier wall of between about 20 and about 50 microns.

4. A secondary battery or cell in accordance with claim 2 wherein a cross section of said major grooves or channels is shaped substantially like an equilateral triangle with the base of said triangle being substantially along the surface of said cation-permeable barrier wall in contact with said cathodic reaction zone and the apex of said triangle being oriented toward the interior of said cation-permeable barrier wall.

5. A secondary battery or cell in accordance with claim 1 wherein said major grooves or channels extend in substantially one direction along substantially the entire cation-permeable barrier surface, said direction being substantially parallel to the vertical axis of said battery or cell.

6. A secondary battery or cell in accordance with claim 5 wherein said porous conductive material does not fill said cathodic reaction zone thereby leaving open spaces in said cathodic reaction zone through which said cathodic reactants are free to flow.

7. A secondary battery or cell in accordance with claim 5 wherein minor grooves or channels extending substantially transverse to said major grooves or channels are disposed in said surface of said cation-permeable barrier wall in contact with said cathodic reaction zone, said minor grooves or channels having smaller dimensions than said major grooves or channels.

8. A secondary battery or cell in accordance with claim 7 wherein said major grooves or channels have a width at the surface of said cation-permeable barrier wall in contact with said cathodic reaction zone of between about 10 and about 100 microns and wherein said major grooves or channels taper inwardly toward the interior of said cation-permeable barrier wall.

9. In a secondary battery or cell comprising:
   A. A container;
   B. A cation-permeable barrier to mass liquid transfer which is disposed within said container so as to create a first reaction zone within said barrier and a second reaction zone between said barrier and said container;
   C. A molten alkali metal reactant-anode within one of said reaction zones in electrical contact with an external circuit;
   D. A cathodic reactant within the other of said reaction zones comprising a liquid electrolyte which is electrochemically reversibly reactive with said anodic reactant and which, when said cell or battery is in at least a partially discharged state, is selected from the group consisting of (a) a single phase composition comprising molten polysulfide salts of said anodic reactant and (b) a two-phase composition comprising molten sulfur and molten sulfur saturated polysulfide salts of said anodic reactant; and
   D. An electrode of porous conductive material within said cathodic reaction zone for transporting electrons to the vicinity of said cation-permeable barrier during discharge of said battery or cell and for transporting electrons away from the vicinity of said cation-permeable barrier during charge of said battery or cell, said porous conductive material being in electrical contact with both said cation-permeable barrier and said external circuit and being immersed, at least in part, in said cathodic reactant,
   wherein the improvement comprises employing a cation-permeable barrier having major grooves or channels disposed in the surface thereof which is exposed to said cathodic reaction zone, said major grooves or channels being devoid of said porous conductive material and being adapted in size and shape such that polysulfide salts within said cathodic reaction zone can flow therein by capillary forces.

10. A secondary battery or cell in accordance with claim 9 wherein said major grooves or channels have a width at the surface of said cation-permeable barrier wall in contact with said cathodic reaction zone of between about 10 and about 100 microns and wherein said major grooves or channels taper inwardly toward the interior of said cation-permeable barrier wall.

11. A secondary battery or cell in accordance with claim 10 wherein said major grooves or channels have a width at the surface of said cation-permeable barrier wall of between about 20 and about 50 microns.

12. A secondary battery or cell in accordance with claim 10 wherein a cross-section of said major grooves or channels is shaped substantially like an equilateral triangle with the base of said triangle being along the surface of said cation-permeable barrier wall in contact with said cathodic reaction zone and wherein the apex of said triangle extends toward the interior of said cation-permeable barrier wall.

13. A secondary battery or cell in accordance with claim 9 wherein said major grooves extend in substantially one direction along substantially the entire cation-permeable barrier surface, said direction being substantially parallel to the vertical axis of said battery or cell.

14. A secondary battery or cell in accordance with claim 9 wherein said porous conductive material does not fill said cathodic reaction zone thereby leaving open spaces in said cathodic reaction zone through which said cathodic reactants are free to flow.

15. A secondary battery or cell in accordance with claim 13 wherein minor grooves or channels extending substantially transverse to said major grooves or channels are disposed in said surface of said cation-permeable barrier wall in contact with said cathodic reaction zone, said minor grooves or channels having smaller dimensions than said major grooves or channels.

16. A secondary battery or cell in accordance with claim 15 wherein said major grooves or channels having a width at the surface of said cation-permeable barrier wall in contact with said cathodic reaction zone of between about 10 and about 100 microns and wherein said major grooves or channels taper inwardly toward the interior of said cation-permeable barrier wall.

17. A secondary battery or cell in accordance with claim 9 wherein said cation-permeable barrier is tubular and wherein the longitudinal axes of said container and said cation-permeable barrier are substantially parallel.

18. A secondary battery or cell in accordance with claim 17 wherein said major grooves or channels have a width at the surface of said cation-permeable barrier wall in contact with said cathodic reaction zone of between about 10 and about 100 microns and wherein said major grooves or channels taper inwardly toward the interior of said cation-permeable barrier wall.

19. A secondary battery or cell in accordance with claim 17 wherein a cross-section of said major grooves or channels is shaped substantially like an equilateral triangle with the base of said triangle being at the exterior of said cation-permeable barrier wall in contact with said cathodic reaction zone and the apex of said triangle being oriented toward the interior of said cation-permeable barrier wall.

20. A secondary battery or cell in accordance with claim 17 wherein said major grooves of channels extend helically along said cation-permeable barrier, the longitudinal axis of said helix extending substantially parallel to the longitudinal axis of said cation-permeable barrier.

21. A secondary battery or cell in accordance with claim 20 wherein the battery or cell is oriented in a vertical position such that the longitudinal axis of said container and said cation-permeable barrier are oriented substantially vertically.

22. A secondary battery or cell in accordance with claim 17 wherein said major grooves or channels extend along said cation-permeable barrier wall in contact with said cathodic reaction zone in a direction substantially parallel to the vertical axis of said battery or cell and wherein said vertical axis of said battery or said cell is substantially parallel to the longitudinal axis of said cation-permeable barrier and said container.

23. A secondary battery or cell in accordance with claim 22 wherein said major grooves or channels have a width along the surface said cation-permeable barrier wall in contact with said cathodic reaction zone of between about 10 and about 100 microns and wherein said grooves or channels taper inwardly toward the interior of said cation-permeable barrier wall.

24. A secondary battery or cell in accordance with claim 23 wherein said major grooves or channels have a width at the surface of said cation-permeable barrier wall of between about 20 and about 50 microns.

25. A secondary battery or cell in accordance with claim 23 wherein a cross-section of said major grooves or channels is shaped substantially like an equilateral triangle with the base of said triangle being along the surface of said cation-permeable barrier wall in contact with said cathodic reaction zone and wherein the apex of said triangle is oriented toward the interior of said cation-permeable barrier wall.

26. A secondary battery or cell in accordance with claim 23 wherein minor grooves or channels having dimensions smaller than those of said major grooves or channels extend circumferentially about said cation-permeable barrier in a direction substantially transverse to the direction of said major grooves or channels.

* * * * *